United States Patent [19]

Morandi et al.

[11] Patent Number: 5,142,966
[45] Date of Patent: Sep. 1, 1992

[54] RAPID COOKING APPARATUS FOR FOOD, IN PARTICULAR PASTA SUCH AS SPAGHETTI

[75] Inventors: Gino Morandi, Bologna; Ettore Santi, Feltre, both of Italy

[73] Assignee: Trading Services International S.r.l., Bologna, Italy

[21] Appl. No.: 707,284

[22] Filed: Dec. 3, 1990

Related U.S. Application Data

[63] Continuation of Ser. No. 210,673, Jun. 21, 1988, abandoned.

[30] Foreign Application Priority Data

Jun. 24, 1987 [IT] Italy ............................ 3531 A/87
Jun. 26, 1987 [IT] Italy ............................ 3538 A/87

[51] Int. Cl.⁵ .......................................... A47J 19/00
[52] U.S. Cl. ........................... 99/352; 99/355; 99/403; 99/407; 99/330; 99/331
[58] Field of Search ............. 99/330, 339, 352, 355, 99/359, 403, 404, 407, 360, 426; 126/20, 20.1, 20.2; 426/523, 402, 462, 507; 221/251, 293, 298; 222/263, 447, 564

[56] References Cited

U.S. PATENT DOCUMENTS

| | | | |
|---|---|---|---|
| 3,210,193 | 10/1965 | Martin | 99/330 X |
| 3,827,344 | 8/1974 | Pratolongo | 99/352 |
| 3,928,045 | 12/1975 | Tsunoda et al. | 99/359 |
| 4,543,878 | 10/1985 | Luchetti | 99/330 |
| 4,569,277 | 2/1986 | Stiglich | 99/330 |
| 4,711,165 | 12/1987 | Codino | 99/353 |
| 4,718,331 | 1/1988 | Ansaloni | 99/352 |
| 4,741,261 | 5/1988 | Di Maria | 99/330 |
| 4,803,916 | 2/1989 | Tacconi | 99/352 |
| 4,869,160 | 9/1989 | Pratolongo | 99/330 |

Primary Examiner—Harvey C. Hornsby
Assistant Examiner—Reginald L. Alexander
Attorney, Agent, or Firm—Guido Modiano; Albert Josif

[57] ABSTRACT

The apparatus comprises a pressurized circuit, wherein water is superheated to a uniform temperature, maintained free of stagnation points of air bubbles and steam, and always kept at a pressure higher than that of saturated steam at the highest temperature reached by the water itself. The superheated water, taken from the highest point of the pressurized circuit, is rapidly introduced into a precooking chamber, in which the food to be cooked has been introduced earlier and in which the pressure of the pressurized circuit is maintained. The food, after a precooking in the chamber, completes its cooking in water at atmospheric pressure in two successive cooking devices and, after the excess water has been extracted, is unloaded onto the plate for the consumer's use.

3 Claims, 3 Drawing Sheets

RAPID COOKING APPARATUS FOR FOOD, IN PARTICULAR PASTA SUCH AS SPAGHETTI

This is a continuation application of application Ser. No. 07/210,673, filed on Jun. 21, 1988, now abandoned.

BACKGROUND OF THE INVENTION

The invention relates to a rapid cooking apparatus for food, in particular pasta such as spaghetti, preset to automatically dosage, cook, drain several servings, even repeatedly. The present description refers to spaghetti, for the sake of simplicity, but it is understood that the invention is applicable to all kinds of food.

Devices are known for the rapid cooking of food servings with superheated water and reviving in boiling water, such as for example those described in the U.S. Pat. Nos. 3,944,678 and WO 87/00 741.

Such known devices, however, have functional and practical defects and disadvantages, and in particular:
- irregular feeding of the food to be cooked;
- ordinary spaghetti cannot be used since known devices are adapted to operate only with special-characteristic spaghetti not commonly available on the market;
- cooking does not yield uniform results;
- the quality of the cooked product is poor, lower than that of products cooked in the ordinary manner;
- the cooking cannot be adjusted to the different tastes of the consumers;
- a large amount of badly cooked food is wasted in case of discontinuous use;
- the hot parts of the device easily clog due to the formation of calcareous matter and to the deposition of impurities present in municipal mains water;
- the chloride contained in the water, subject to superheating under pressure, impregnates the product in a disgusting manner;
- the amount of water which remains in the food after draining is uneven.

SUMMARY OF THE INVENTION

The aim of the present invention is therefore to provide an appraratus which allows the rapid, perfect and constantly repeatable preparation of servings of cooked food, with particular reference to ordinary commercial spaghetti, with the best qualitative results.

This aim is achieved by a rapid cooking apparatus for food, in particular pasta such as spaghetti, comprising a volumetric distributor of food doses, a first pressurized precooking chamber and two successive atmospheric-pressure cooking completion chambers arranged in series to one another and to the precooking chamber, said chambers having walls controlled by thermostats at temperatures determined according to the type of food, valves for the cutoff of the inlet and of the outlet of said precooking and cooking chambers, a circuit for the preparation of superheated water comprising two heaters, wherein the water is always kept at a pressure higher than that of saturated steam, and arranged so as to avoid the formation of air and steam bubbles, said heaters supplying an amount of pressurized, superheated and uniform-temperature water, at the beginning of each cooking cycle, said water being sufficient to fill the precooking chamber, a first device for recovering heat from the steam discharged from the precooking chamber and a second device for recovering heat from the liquid drained from the dose of cooked food, means for pressurizing the water superheated in the heaters at a pressure higher than that of saturated steam, pneumatic actuators for the rapid actuation of said cutoff valves of the precooking and cooking chambers, and a programmable electronic system for the control and timing of the apparatus.

BRIEF DESCRIPTION OF THE DRAWINGS

The invention is described hereinafter with reference to the accompanying drawings, wherein.

DESCRIPTION OF THE PREFERRED EMBODIMENTS

Figure 2:
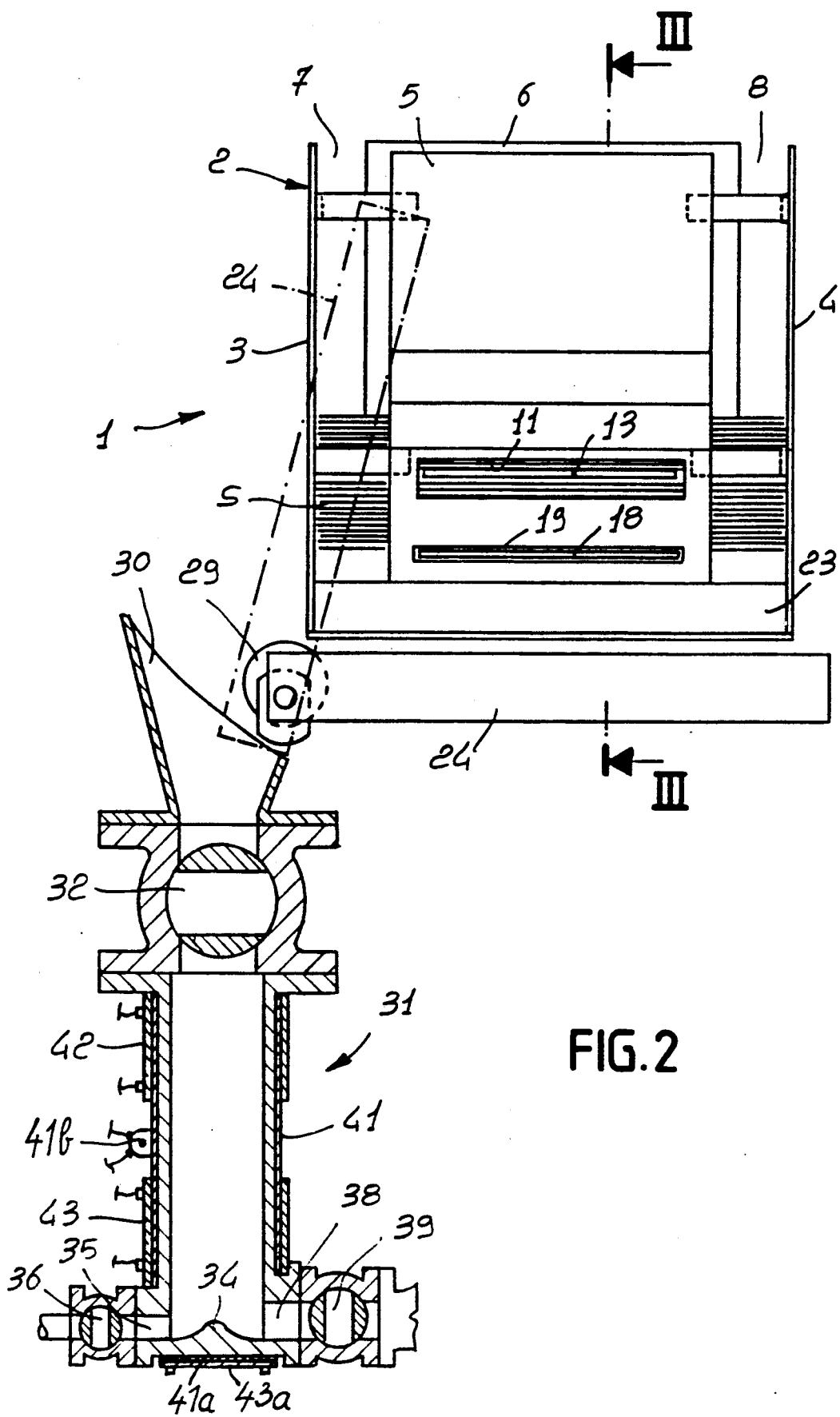
FIG. 2 is an enlarged front view of the spaghetti dosage device and a sectional view of the precooking chamber.
Figure 3:
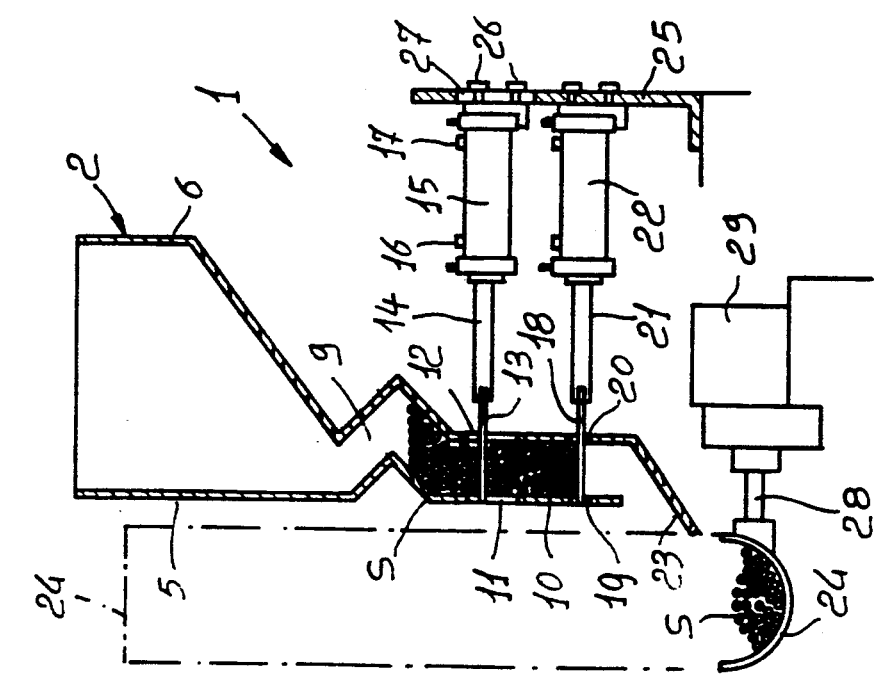
FIG. 3 is a sectional view taken along the line III—III of FIG. 2.

With reference to FIGS. 2 and 3, the reference numeral 1 generally indicates a spaghetti dosage device which is constituted by a hopper 2 in which the spaghetti S are arranged horizontally. In FIG. 2 the spaghetti are seen from side, in FIG. 3 they are seen head-on.

The hopper 2 is constituted by two planar vertical side walls 3, 4 perpendicular to the spaghetti S, by a front wall 5 and by a rear wall 6. The walls 5, 6 have a width which is smaller than the distance between said side walls, so the ends of the spaghetti are free.

In their lower part the walls 5,6 have facing folds which define a zigzag channel 9 which sorts the descent of the spaghetti, arranging them parallel. The terminal portion of the channel 9 defines a volumetric dosage chamber 10. In the portions of the walls 5,6 which delimit the chamber 10 there are two opposite ports 11,12 elongated in the direction of the spaghetti, in which a blade 13 engages and is carried by the stem 14 of a double-action pneumatic cylinder 15. FIG. 3 illustrates the electromagnetic position sensor 16, 17 which indicate when the piston has reached its corresponding stroke limits. It should be noted that all the pneumatic actuators mentioned hereinafter, whether linear or rotary, are similarly equipped with stroke limit sensors not indicated in the figures. In FIG. 3 the blade 13 is illustrated in the position in which it cuts off the channel 9 and supports the overlying spaghetti.

Below the supporting blade 13 there is another parallel blade 18 which passes through corresponding ports 19,20 of the walls 5,6, and, together with the blade 13, delimits the volumetric dosage chamber 10 for the doses of spaghetti to be cooked. The blade 18 is connected to the stem 21 of a pneumatic cylinder 22. When the blade 13 is outside the channel 9, the blade 18 is inserted, so that the spaghetti S fill the chamber 10. When the chamber 10 is filled, the upper blade 13 is inserted, supporting the overlying spaghetti, and the blade 18 is extracted, allowing the measured portion of spaghetti to drop onto an underlying inclined plane 23 which directs them towards a collecting channel 24 which is open at its opposite ends.

The size of the spaghetti doses can be adjusted, according to the requirements, by raising or lowering the upper blade 13 and the related pneumatic cylinder 15.

For this purpose, to allow the vertical movement of the blade 13, the ports 11, 12 have an adequate height, while the cylinder 15, for example, is applied to a support 25 by means of bolts 26 which engage in a vertical slot 27 of the support.

One of the ends of the collecting channel 24 is rigidly and rotatably associated with the output shaft 28 of a pneumatic rotary motor 29 which is capable of causing the oscillation of the channel between a horizontal spaghetti reception position, illustrated in full lines in FIGS. 2 and 3, an are inclined position, illustrated in broken lines, for the unloading of the spaghetti into a funnel 30. It should be noted that during this oscillation the channel 24 passes in front of the front wall 5. After unloading the dose of spaghetti into the channel 24, the blade 18 is returned to the position of closure of the chamber 10 and another dose of spaghetti is formed, and so on.

The reference numeral 31 indicates the chamber for the precooking of the pasta with superheated overpressurized water. The chamber 31 is constituted by a cylindrical tube with circular cross section, the height whereof is greater than the length of the spaghetti S.

Figure 1:
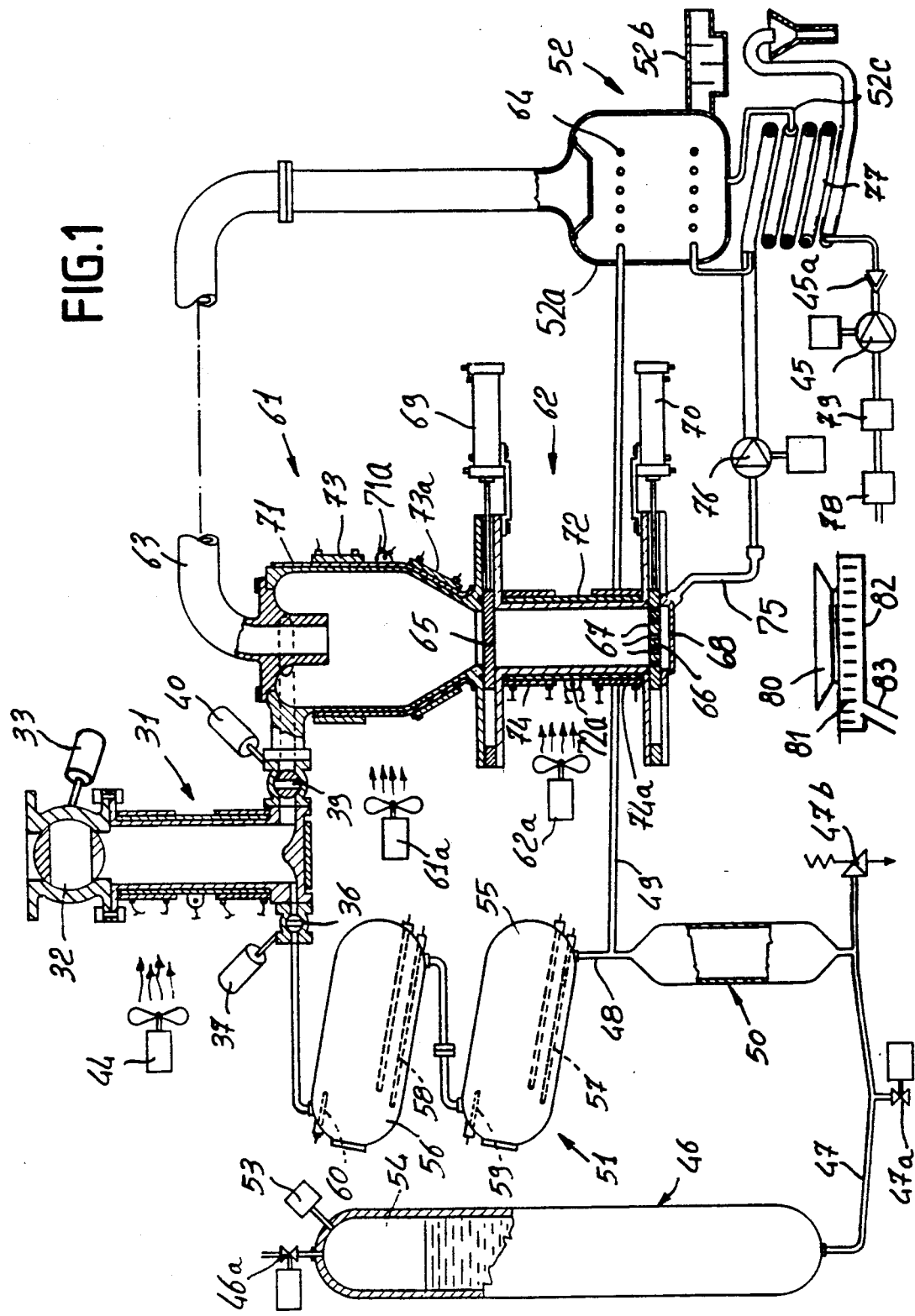
FIG. 1 is a schematic view, partially sectioned, of an apparatus for cooking servings of spaghetti according to the invention.

The tube is upwardly closed by a valve 32, preferably of the ball type, illustrated in closed condition in FIG. 1, which can be opened by making it rotate for 90 degrees by means of the pneumatic rotary motor 33.

The tube 31 is arranged with a vertical axis and is closed at its lower end by a centrally domed bottom 34 to spread out the bundle of spaghetti at its base.

Flush to the bottom of tube 31, or in any case proximate to said bottom, there is an inlet 35, for superheated and overpressurized water, controlled by a valve 36, preferably of the ball type, which can be opened and closed by rotation by a pneumatic rotary motor 37.

Flush to said bottom, in another position (in the figure it is shown in front of the hole 35, for example) there is a larger outlet hole 38 controlled by a valve 39, preferably of the ball type, actuated between an opening position and a closing position by the pneumatic rotary motor 40. For hygienic reasons the tube 31 is manufactured in stainless steel, which is notoriously a poor heat conductor.

Thus, to make the temperature of the tube wall and bottom uniform, in close contact with their surface there is a jacket 41,41a of a material which is a good heat conductor, preferably copper, of adequate thickness. Heating resistors 42, 43 and 43a and a temperature sensor 41b are arranged on the outer wall of the jacket.

It has been observed experimentally that for optimum cooking, the walls' temperature of the tube 31 must be much lower than the superheated precooking water temperature, but at the same time the walls' temperature must never drop below approximately 100 degrees Centigrade.

Since in the case of a continuous series of cooking operations, the temperature of the walls of the tube 31 rises to excessive values, the walls of the tube are cooled, during continuous-cooking cycles, by blowing ambient air onto said walls with a fan 44. The air current may be appropriately conveyed around the wall of the tube by a cowling, not illustrated in the figures.

The precooking tube 31 is connected, through the motorized valve 36, preferably of the ball type, to a pressurized circuit for the production of superheated water subject to a pressure higher than that of saturated steam at the temperature of the water itself.

Said circuit is comprised between the one-way valve 45a on the delivery of the pump 45 and the valve 36 for the introduction of the superheated water into the pressurized precooking chamber 31.

The pressure in the pressurized circuit is maintained by a self-pressurizing surge-tank plenum chamber 46, having an upper vent valve 46a motorized by a pneumatic actuator, by means of tubes 47, 48 and 49, of adequate cross section, and connecting the plenum chamber 46, a separator drum 50, a heating unit 51 and a heat recovery and preheating unit 52. At the lowest point of the tube 47 there is an emptying valve 47a motorized by a pneumatic actuator. A safety valve 47b is also arranged on the tube 47.

The pressure in the plenum chamber 46 is controlled by the pressure switch 53, which starts the pump 45 whenever the pressure drops below a preset value greater than the saturated-steam tension at the maximum temperature of the water in the pressurized circuit.

The volume of the air chamber 54 of the surge-tank plenum chamber, at the minimum pressure which can occur therein before the pressure switch intervenes, is sufficient, when the transfer of the superheated water from the circuit into the precooking chamber 31 takes place while said minimum pressure occurs in the plenum chamber, to allow the pressure, which reduces further as an effect of the expansion of the air consequent to the rapid transfer of water from the pressurized circuit into the chamber 31, to always remain greater than the maximum saturated-steam pressure of the superheated water in the pressurized circuit.

The lines of the pressurized water from the pump 45 to the valve 36 and from the low point 47 of the circuit, below the separator drum 50, to the valve 36, including the line within the heater 51, and to the plenum chamber 46, are all directed upwards so that no stagnation of air can occur in them.

The heater unit is preferably constituted by at least two heaters in series, 55 and 56, with electric resistors 57 and 58 or other heating means, controlled by separate thermostats which are in turn controlled by sensors 59, 60. As a further protection, safety thermostats, not illustrated in the figures, are provided in the two heaters 55, 56.

The water is brought to a temperature close to that of the desired superheating in the preliminary heating chamber 55.

The superheating is completed with fine adjustment in the successive heating chamber 56, until a mass of water at the superheating temperature required for the good execution of the precooking and sufficient to fill the chamber 31 is obtained in the superheated itself.

In order to achieve the best accuracy in temperature, the sensors 59, 60 are of the low thermal-inertia type and transmit the detected signal to the control system which, as the temperature approaches the prescribed values, progressively reduces, in one or two steps, the average electric heating power by means of periodic interruptions of the electric current having extremely short duration cycles with respect to the duration of the cooking cycle.

With this apparatus the control of the pressure and the corresponding operation of the pump 45 occur fully independently of the opening of the valve 36 and are controlled exclusively by the pressure switch 53. Temperature control is in turn independent of pressure control, unless the pressure drops below a minimum allowed value, below which the control system of the apparatus disconnects the water heaters.

The cooking apparatus is completed by two cooking completion chambers or cookers 61, 62. The chamber 61 receives the food precooked in the tube 31 together with its precooking water, expelled by the pressure and by the development of steam in the tube 31, when the valve 39 opens. The extremely rapid opening of this valve, achieved by means of the pneumatic motor 40, is essential to achieve the complete emptying of the chamber 31.

The steam formed in the expansion is conveyed through the tube 63 into the preheater 52, in which it condenses on a tube nest or pipe coil 64, through which water arriving from the pump 45 flows; the pipe coil 64 is contained in a drum 52a downwardly provided with a silencer 52b for venting the air.

The water and the spaghetti remain in the chamber 61, in which the cooking of the spaghetti is performed, for the duration of the cycle.

The chamber 61 is connected to the underlying chamber 62 through a guillotine valve 65 which, after the time of permanence of the spaghetti in the chamber 61 has elapsed, opens and drops the spaghetti and the water into the underlying chamber 62 in which the spaghetti remain until the end of the cycle and complete their cooking.

The chamber 62 is downwardly closed by the guillotine valve 66 which comprises a perforated surface 67 and an underlying bottom 68 which forms a collector for the excess water which still remains on the spaghetti. The guillotine valves 65, 66 are controlled by pneumatic cylinders 69, 70. At the end of the cooking the valve 66 opens and drops the cooked spaghetti onto the underlying plate 80 which is supported by a grid 81 with underlying tray 82 for collecting the water and outlet 83 for discharging it. The upper chamber 61 has a downwardly convergent cylindrical shape, while the lower chamber 62 is substantially cylindrical. Like the chamber 31, the chambers 61, 62 are also manufactured, in stainless steel, for hygienic reasons, and are externally covered with layers 71, 72 of a material which is a good heat conductor, e.g. copper. The electric heating resistors 73,73a and 74, 74a, together with the temperature sensors 71a, 72a, are arranged around the jackets 71, 72. Fans 61a, 62a are furthermore provided which, if required, are activated to cool the walls of the chambers 61, 62 after the disconnection of the related resistors. If the temperature of the two chambers is to be kept close to 100° C., the fans 61a and 62a can be omitted and the chambers may be covered with a thermal insulating material external to the resistors. The collecting bottom 68 is connected, through a flexible tube 75, to the intake of a volumetric metering pump 76 which drains from the spaghetti a precisely measured amount of cooking water and sends it to the pipe-coil exchanger 77 in countercurrent to the fresh water sent by the pump 45 into the pressurized circuit.

The condensation water of the steam arriving from the exchanger 52 mixes with the water arriving from the pump 76 in an intermediate point of the pipe coil 77 through a connecting tube 52c.

It should be observed that the volumes of warm and cold water contained in each of the exchangers 52, 77 are greater than the amount of water introduced into the precooking chamber 31 at each cycle and than the volume of the chamber 31 itself, so that in these exchangers the heat exchange occurs between the individual masses which pass through the exchangers themselves, even when one or the other of the currents which flow through them is not moving, through the corresponding exchange transients.

The apparatus is completed by a programmable electronic control and timing system, comprising at least one microprocessor, with buffer battery, fed by the mains electric supply and hereinafter termed control system; the temperature detectors, the pressure detectors, the product detectors in the dosage device and the opening and closing positions detectors of all the pneumatic actuators, not indicated in the figures, send signals to said control system.

Figure 4:
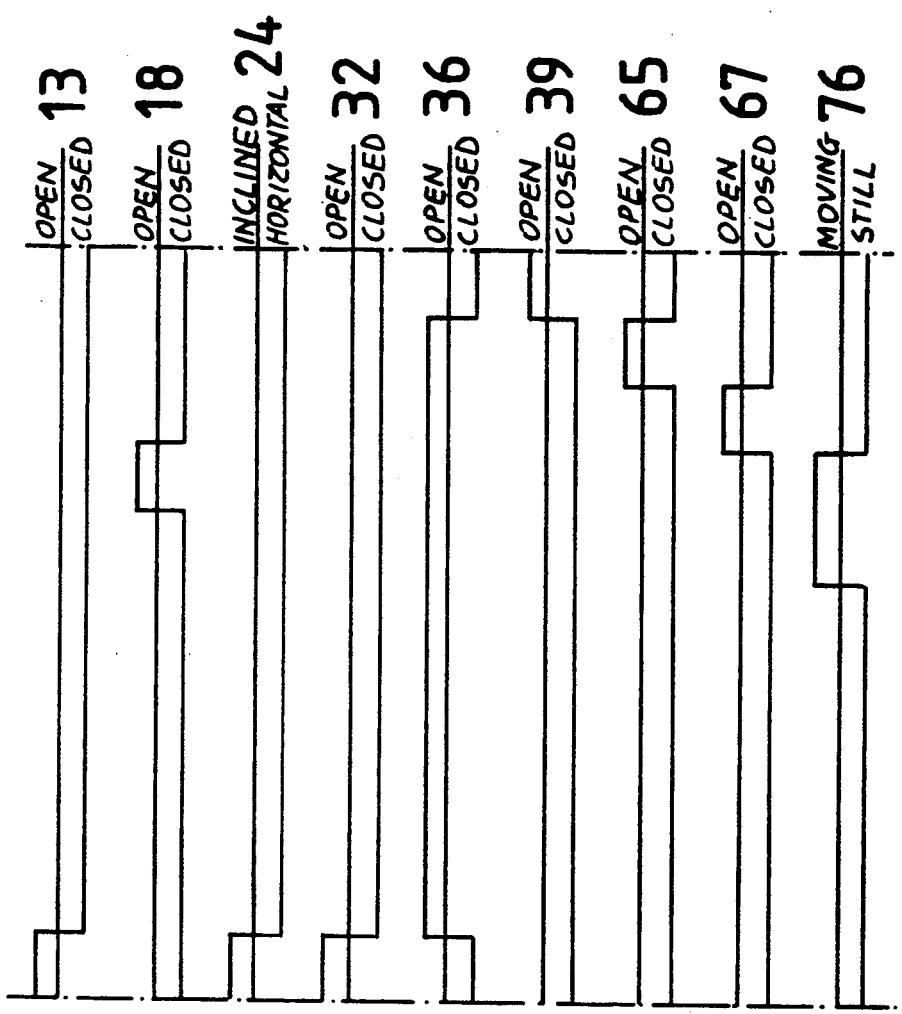
FIG. 4 is a diagram of the operative steps of the apparatus.

The control system adjusts the temperature and the opening and closing steps of the individual control elements according to the signals which it receives from the various parts of the system and allows to vary the duration of the cycle and of the water extraction step by following the operations logic illustrated in the diagram of FIG. 4.

The apparatus furthermore comprises an electric buffer battery for controlling the electric valves in case of power blackout.

The apparatus also comprises a known water purifying system, comprising an active-carbon unit 78 for eliminating bad odors, chloride or other substances, and another base-exchange unit 79 for eliminating calcium salts.

The operation of the apparatus is as follows.

The desired dose of spaghetti is first of all introduced in the chamber 31 by opening the valve 32 and by dropping the spaghetti by means of the rotation of the channel 24 to the inclined position indicated in dotted lines in FIG. 2. The valve 32 is then closed, and while the valve 39 for discharging the precooked food into the second cooker 61 is also kept closed, the valve 36 is opened, and the water superheated at 160–170 degrees Centigrade and at the pressure of 8–10 actual atmospheres is rapidly pushed by the pressurized circuit through said valve 36 to fill the chamber 31. The water required to fill the precooking chamber 31 is supplied by the plenum chamber 46 through the compensator 50 and the two heaters 55, 56. The air contained in the chamber 54 of the plenum chamber 46 expands and occupies the volume left empty by the water which has moved into the chamber 31: as mentioned, the minimum intervention pressure of the pump 45 controlled by the pressure switch 53 is such that, after the abovementioned expansion, the pressure is still higher than the maximum saturated-steam pressure of the superheated water in the circuit. In this manner no formation of steam or stagnation of air occurs in any part of the circuit.

To ensure this condition, the actuation for the opening of the valve 36 depends, through the control system of the apparatus, on the existence in the chamber 54 of a pressure sufficient for the abovementioned effects and purposes.

The valve 36 is preferably kept open for the almost entire duration of the precooking step and is closed only shortly before the opening of the valve 39 for the transfer of the precooked food into the second cooker 61. In this manner the required filling of the precooking chamber 31 with superheated and pressurized water is always ensured.

Heat dispersions are compensated by the electric resistors 42, 43 and the temperature in the chamber 31 is kept at between 100 and 110 degrees Centigrade for cooking hard-corn spaghetti having a diameter comprised between 1.3-1.7 mm. When the walls are too hot they are cooled by the fan 44, which is also controlled by the control system.

When the pressure in the surge-tank plenum chamber 46 has dropped below the intervention value of the pressure switch 53, the pump 45 is started by said pressure switch and remains active until the disconnection pressure of the pressure switch 53 is attained. All this occurs fully independently of the opening or not of the valve 36.

Due to the quick the transfer of water into the chamber 31, almost all the water entering the chamber 31 always arrives from the plenum chamber 46.

The refilling of water into said plenum chamber is performed gradually by the pump 45 by sending the water through the heat recovery means 52, 77. If the mains water supply allows it and provides sufficient pressure, instead of the pump, a direct connection to the mains supply itself may be provided by means of a cut-off valve and a pressure adjustment device in case of excessive mains pressure.

The separator drum 50, constituted by a relatively long tube, which is vertical or rises towards the heaters and has a volume greater than that of the precooking chamber 31, avoids the mixing of said preheated water with the water mass in the plenum chamber, thereby causing the preheated water to become too cold and unnecessary of heating the plenum chamber water.

When the valve 36 of the precooking chamber 31 is opened, the cold water arriving from the plenum chamber 46 occupies part of the volume of the separator 50 without entering the circuit which extends from the valve 45a to the valve 36.

When, as an effect of the decreased pressure, the pump 45 sends water which has been preheated in the heat exchangers 52, 77 towards the plenum chamber 46, said water partially fills the separator 50 without mixing with the cold water of the plenum chamber.

An excess of pressure in the circuit is prevented by the safety valve 47b which, if the pressure reaches the maximum allowed safety level, discharges water and allows the expansion of air in the plenum chamber 46, returning the pressure within the allowed value.

In any case the exit of the air of the plenum chamber 46 from said plenum chamber by expansion and its arrival into the heaters 55, 56, where it may cause damage to the electric resistors or to other heating means, must be avoided. This danger can be avoided with membrane plenum chambers or with float valves at the base of the plenum chamber, which cut off the outflow of the air from the plenum chamber.

A preferred solution, illustrated in the figures, is that of providing the plenum chamber 46 of such a volume that, when it is completely filled with air (by discharging all the liquid contained therein through the valve 47a with the valve 46a open and by subsequently refilling it with water by means of the pump 45 after closing the valves 47a and 46a), a volume of air sufficient for operation in the above described manner forms again in the chamber 54, always keeping the pressure in the circuit above the saturated-steam pressure of the superheated water. By means of this sizing, even if the pressure in the circuit were to drop to zero, the air would expand to occupy the entire volume of the plenum chamber without exiting therefrom and entering the circuit which is to be pressurized.

The superheated water continues to enter the precooking chamber 31 until the pressure therein becomes (and remains) equal to that of the pressurized circuit.

FIG. 4 illustrates the operating steps of the mechanisms of the dosage device and of the valves, actuated by the control system by means of the electropneumatic valves (their operation being ensured by the buffer battery in case of power blackout) for the distribution of the compressed air and for venting or relieving the pressure from the pneumatic actuators. Said steps are subject to the opening and closing checks of the other valves, and to temperature and pressure checks, effected by means of the transmission of the signals from the position, temperature and pressure sensors to the control system, and by means of the processing therein of said signals. The temperature signals furthermore actuate, through power switches actuated, by the control system, the heating resistors and the cooling fans of the thermostat-fitted surfaces.

The duration of the cycle and the duration of the step of draining of the water from the third cooking chamber can be varied using a keyboard for the input data into the control system, via the water-extraction metering pump, before the opening of the spaghetti discharge valve 67.

The control system comprises a memory for recording the number of required doses to be fed one after the other into the precooking chamber 31, with countdown of the exited doses and display of the pending doses, with a keyboard for increasing and for decreasing down to the minimum value of the doses already being cooked in the apparatus. The control system finally comprises the programs for the execution of the start-up and shut down cycles of the apparatus and of the transient for power shortage. The apparatus has an air compressor with a compressed air tank and accessories for the purification and adjustment of the air for the pneumatic actuators or has a corresponding mains compressed-air connection, fitted with pressure detectors.

The basic peculiarity of the invention resides in that the pressure in the chamber 31 always remains at a higher value than the saturated-steam pressure at the maximum temperature of the superheated water: this prevents, within the entire pressurized circuit, the formation of a two-phase fluid, i.e. the simultaneous presence of water and steam, which is substantially the cause of the poor operation of known devices. The adoption of the two heaters 55, 56 arranged in series furthermore allows to optimize the temperature of the water in the upper heater 56.

A further peculiarity of the invention resides in the fitting of thermostats, i.e. in the maintenance of the walls of the cooking chambers at a preset uniform temperature by means of an outer jacket made of a metal which is a good heat conductor, on which electric resistors and temperature sensors are arranged, and by means of cooling fans. By means of the described apparatus, cooking cycles of portions of 100 grams of spaghetti having a diameter of 1.7 mm have been performed in 70 seconds, with the superheated water at the temperature of approximately 150° C., with the walls of the cooking chambers controlled by thermostats to approximately 100 degrees Centigrade, at the actual pressure of 8 atmospheres, obtaining an excellently tasting and savory, perfectly cooked product, with an optimum amount of residual water. These results have been observed without exception both in individual cycles spaced in time and in the production in continuous succession of cooked portions at a rate of 70 seconds between one portion and the next. The analyses of the raw and cooked spaghetti and of the discharged cooking water have shown that, with respect to ordinary cooking in a pot at 100 degrees, spaghetti cooked with the described apparatus have a much better appearance on the plate, due to their consistency and color, have a significantly lower cooking loss, produce a lower release of starch into the cooking water and have an optimum content of maltose, slightly greater than half their dextrin content, which gives the cooked pasta a pleasant taste.

In a variated aspect of the invention the pump 45 is controlled by a detector of the correct presence of water at the intake of said pump to avoid its actuation without water and therefore prevent its damage.

To bring the system to operating conditions starting from a cold apparatus with no water, with all the valves open, the air compressor is started (or the connection to the mains compressed air is opened), and when the pressure check of the valve actuation air is positive all the valves are closed and the pressure switch 53 is connected for operation.

The pump 45 starts and sends water into the self-pressurizing plenum chamber 46, compressing the air in the chamber 54, in the separator 50 and in the heaters 55, 56.

In this step the resistors 57 and 58 are not connected, while the resistors 42, 43, 43a, 73, 73a, 74, 74a are connected under the control of their respective thermostats. When the maximum pressure is reached in the plenum chamber 46, the pressure switch 53 stops the pump via the control system and starts a series of dummy cycles, unheated and without a load of spaghetti. When the pressure in the plenum chamber 46 drops to the intervention value of the pressure switch 53 which starts the pump 45, the control system interrupts the series of dummy cycles and resumes it when the pressure has again risen to the intervention value of the pressure switch 53.

The process thus continues with the apparatus unheated and empty until a washing of all the parts with cold water has been performed, and all the air contained in the two heaters 55, 56 has been expelled upwards and discharged.

At this point the resistors 57, 58, controlled by the respective thermostats, are activated.

When the positive check of all the temperatures is obtained, two heated dummy cycles (with no spaghetti load) are performed to complete the washing of the apparatus, after which the apparatus is ready for the regular operating cycles and gives a visual signal indicating that it is ready to operate, preferably preceded by an acoustic signal.

During the use of the apparatus, the operator requests the number of required doses via a control keyboard and these, under the control of the control system, are individually introduced in succession into the first-cooking chamber 31 and from there, following the cycle, transferred into the other two chambers 61 and 62; the cooked doses, with the required amount of water, are finally unloaded onto the serving plate 80.

During this function the operator may still increase or reduce the request for cooked doses (except for those already being cooked, which are completed in any case).

An appropriate display always indicates the number of pending doses the cooking whereof will be completed by the machine, one after the other, if there is no variation in the requests.

Once the cooking of the requested doses has been completed, the apparatus stops in ready condition, with all the pressures and temperatures set, and ready to receive and satisfy further requests for cooked doses.

We claim:

1. Rapid cooking apparatus for food, in particular pasta such as spaghetti comprising a volumetric distributor of food doses;

a heating unit for the preparation of superheated water;

means for pressurizing the superheated water in said heating unit at a pressure higher than that of superheated water;

a pressurized pre-cooking chamber having a first inlet connected to said volumetric distributor to receive food doses therefrom, a second inlet connected to said heating unit for entering a predetermined volume of superheated pressurized water into said pre-cooking chamber, and an outlet for discharging the pre-cooked food doses;

a first atmosphere-pressure cooking completion chamber having an inlet connected to said outlet of said pre-cooking chamber;

a second atmosphere-pressure cooking completion chamber arranged below said first cooking completion chamber and connected therewith and having a lower opening for discharging the food doses after cooking completion;

cutoff valves arranged between said pre-cooking and first cooking completion chambers, between said first and second cooking completion chambers and at said first and second inlets of said pre-cooking chamber and at said lower discharge opening of said second cooking completion chamber;

pneumatic actuators controlling said cutoff valves in time relationship so as to permit dropping of food doses into said pre-cooking chamber, passage of said food doses from said pre-cooking chamber through said first cooking completion chamber into said second cooking completion chamber and discharge through said discharge opening;

said pre-cooking and cooking completion chambers having walls externally covered with a layer of metal which is a good heat conductor, said layer being in close contact with said walls;

electric resistors externally surrounding said layer of heat conducting metal;

cooling fans arranged so as to blow air against said walls;

thermostatic means for controlling said resistors and fans at a predetermined temperature according to the type of food to be cooked;

said pressurizing means comprising a water supply pump, a surge-tank plenum chamber and a separator arranged in series between said water supply pump and said plenum chamber, said separator comprising a substantially vertical tube having a lower end connected to said plenum chamber and an upper end connected to said water supply pump, said tube having a volume greater than said predetermined volume of superheated pressurized water to be supplied into said pre-cooking chamber;

means for sensing the pressure in said plenum chamber and controlling said water supply pump to maintain said pressure greater than that of saturated steam;

tube means for conveying steam and water from said first and second cooking completion chambers respectively;

heat recovering means connected to said tube means for recovering heat from said steam and water and for pre-heating the water supplied by said pump;

said heating unit comprising a first heater and a second heater connected in series and arranged to avoid formation of air and steam bubbles inside said heaters, said first heater being connected to said upper end of said tube and adapted to heat said pressurized water at a temperature proximate to preset final temperature and second heater being connected to said second inlet of said pre-cooking chamber and adapted to super-heat the water heated in said first heater at said preset final temperature and to supply a quantity of pressurized super-heated water sufficient to fill said pre-cooking chamber.

2. Apparatus according to claim 1 wherein the lower discharge opening of said second cooking completion chamber is controlled by a guillotine valve comprising a perforated surface and a collecting bottom arranged below said perforated surface, said collecting bottom being connected to a metering pump for draining water from the food in said second cooking completion chamber and conveying said drained water to said heat recovering means.

3. Apparatus according to claim 1 wherein said volumetric distributor comprises a hopper for supporting spaghetti in horizontal arrangement, and defining a lower zigzag channel having a terminal portion, a pair of superimposed parallel blades engaging said terminal portion to define a volumetric dosage chamber having a lower exit, pneumatic actuators for alternatively actuating said blades between a retaining position in which a metered quantity of spaghetti fills said dosage chamber and a release position in which said metered quantity is allowed to drop from said exit with said spaghetti in horizontal arrangement, an inclined plane arranged at the exit of said dosage chamber, a pneumatic rotary motor having an output shaft, a channel mounted on said output shaft to rotate in a vertical plane adjacent said inclined plane, said motor rotating said channel between a horizontal position in which said channel is arranged below said inclined plane to receive said metered quantity of spaghetti and an inclined position for the discharge of said quantity into said pre-cooking chamber.

* * * * *